(12) United States Patent
Song et al.

(10) Patent No.: US 11,907,201 B2
(45) Date of Patent: Feb. 20, 2024

(54) IDENTIFIER TECHNOLOGY FOR ENTERTAINMENT DATA

(71) Applicant: Home Box Office, Inc., New York, NY (US)

(72) Inventors: Jack Song, Shoreline, WA (US); Gregory John Bellingham, Seattle, WA (US); Richard Kilgore, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 34 days.

(21) Appl. No.: 17/644,824

(22) Filed: Dec. 17, 2021

(65) Prior Publication Data

US 2022/0114161 A1    Apr. 14, 2022

Related U.S. Application Data

(63) Continuation of application No. 16/292,835, filed on Mar. 5, 2019, now Pat. No. 11,238,026.

(60) Provisional application No. 62/771,234, filed on Nov. 26, 2018.

(51) Int. Cl.
  *G06F 16/23*      (2019.01)
  *G06F 16/955*     (2019.01)

(52) U.S. Cl.
  CPC ........ *G06F 16/2365* (2019.01); *G06F 16/955* (2019.01)

(58) Field of Classification Search
  CPC ............................ G06F 16/2365; G06F 16/955
  See application file for complete search history.

(56) References Cited

U.S. PATENT DOCUMENTS

| | | |
|---|---|---|
| 8,041,746 B2 | 10/2011 | Stuhec |
| 8,364,720 B2 | 1/2013 | Levy |
| 8,601,578 B1 | 12/2013 | Gertzenstein et al. |
| 9,672,293 B2 | 6/2017 | Parker et al. |
| 9,971,840 B2 | 5/2018 | Logan et al. |
| 10,701,040 B2 | 6/2020 | Watson et al. |
| 2003/0061278 A1 | 3/2003 | Agarwalla et al. |

(Continued)

OTHER PUBLICATIONS

International Search Report and Written Opinion received for PCT Application Serial No. PCT/US2019/062944 dated Feb. 20, 2020, 13 pages.

(Continued)

*Primary Examiner* — William Spieler
(74) *Attorney, Agent, or Firm* — Amin, Turocy & Watson, LLP

(57) ABSTRACT

The technology described herein is generally directed towards relating inconsistent identifiers of the same entertainment data entity (such as a movie) to one another. A global identification service, given an entertainment data entity identifier, returns identifier information and related data according to other naming conventions. Canonicalization rules and standards provide a consistent identifier for variously named/identified entertainment entities. A canonicalized identifier (or another identifier) may be part of a URN-based naming convention that identifies the entertainment data entity, as well as the organization that owns the entity and an authority within the organization that is responsible for that entertainment data entity.

17 Claims, 14 Drawing Sheets

(56) References Cited

U.S. PATENT DOCUMENTS

| | | |
|---|---|---|
| 2010/0114857 A1 | 5/2010 | Edwards et al. |
| 2013/0144834 A1 | 6/2013 | Lloyd et al. |
| 2014/0214778 A1 | 7/2014 | Betz |
| 2015/0156162 A1 | 6/2015 | Kaliski, Jr. et al. |
| 2016/0378817 A1 | 12/2016 | Fuller et al. |
| 2017/0177584 A1* | 6/2017 | Narasimha ......... H04N 21/8352 |
| 2018/0013720 A1 | 1/2018 | Sachdev et al. |
| 2018/0096018 A1 | 4/2018 | Cazin |

OTHER PUBLICATIONS

International Search Report and Written Opinion received for PCT Application Serial No. PCT/US2019/062944 dated May 26, 2020, 14 pages.

Non-Final Office Action received for U.S. Appl. No. 16/292,835 dated Dec. 28, 2020, 38 pages.

Final Office Action received for U.S. Appl. No. 16/292,835 dated Jun. 8, 2021, 41 pages.

Office Action received for European Patent Application Serial No. 19829372.2 dated Aug. 18, 2023, 11 pages.

* cited by examiner

IDENTIFIER TECHNOLOGY FOR ENTERTAINMENT DATA

CROSS-REFERENCE TO RELATED APPLICATIONS

This application is a continuation of, and claims priority to each of, U.S. patent application Ser. No. 16/292,835, filed on Mar. 5, 2019, entitled "IDENTIFIER TECHNOLOGY FOR ENTERTAINMENT DATA", and now issued as U.S. Pat. No. 11,238,026, which claims the benefit of U.S. Provisional Application No. 62/771,234, filed on Nov. 26, 2018, entitled "IDENTIFIER TECHNOLOGY FOR ENTERTAINMENT DATA". The entireties of the aforementioned applications are hereby incorporated herein by reference.

BACKGROUND

When referring to entertainment data, the same entity such as a movie often has inconsistent identifiers. For example, the same movie may have one identifier in one system (e.g., of one enterprise), and another identifier in another system (e.g., of another enterprise).

In part this is because different groups and enterprises that deal with entertainment data, including groups within the same organization, can name entities with no particular regard to other groups' need for those entities. As a result, various databases exist with records for such entities, with different databases often keyed with different identifiers representing the same entity.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, aspects of the technology described herein are generally directed towards dealing with inconsistent identifiers, and assigning uniform and consistent identifiers to entertainment data entities such as movies and television programs. The technology can include a service that can relate inconsistent identifiers of the same entertainment data entity (e.g., that use other naming conventions) to one another. The technology can include a system of canonicalization rules and standards so that any entertainment data entity is given a consistent identifier. A canonicalized identifier (or another identifier) may be part of a URN-based (uniform resource name-based) naming convention that identifies the owning organization (e.g., HBO) and responsible authority (e.g., internal group or team that controls the entity and is thus determines any "source of truth" for the name), as well as identifying the entertainment data entity.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards associating uniform and consistent identifiers to entertainment data entities such as movies and television programs. In one or more aspects, a global identification service can be provided that can relate different entity identifiers to one another, such as for comparison, lookups, finding related information and so forth. The global identification service thus can relate information related to entertainment data that is exchanged by various organizations, as well as relate information that is used and exchanged by various groups within an organization.

In one or more aspects, a canonical identification scheme for entertainment data can be provided to convert any entity (e.g., movie, television series and the like) into a canonical, unique identifier, in a way that is consistent regardless of its source, regardless of its actual identifier and/or despite any minor variations in how its properties are indicated, so that entities can be related across various sources or systems.

In one or more aspects, a convention system for uniform resource name-based identifiers provides a naming convention based upon Uniform Resource Names (URNs) that keeps the names of entities such as corporate assets and resources consistent and their responsible owners identifiable across an organization (e.g., software developer teams, content production teams, databases and so forth). At the same time, the convention system allow for some flexibility in the naming process. By keeping resource naming conventions consistent across groups, entities including corporate assets and resources are named consistently, yet each group has flexibility with respect to how that group wants to internally identify an entity.

It should be understood that any of the examples herein are non-limiting. For instance, in one or more implementations, a pipe "|" character is described as one way to concatenate an entity type's canonical properties together; however it is understood that any suitable (e.g., distinctive and non-conflicting) character or set of one or more characters can be used instead. As long as the canonicalization rules are consistent, then the same canonicalized output will result for the same entity. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in data identification in general.

Figure 1:
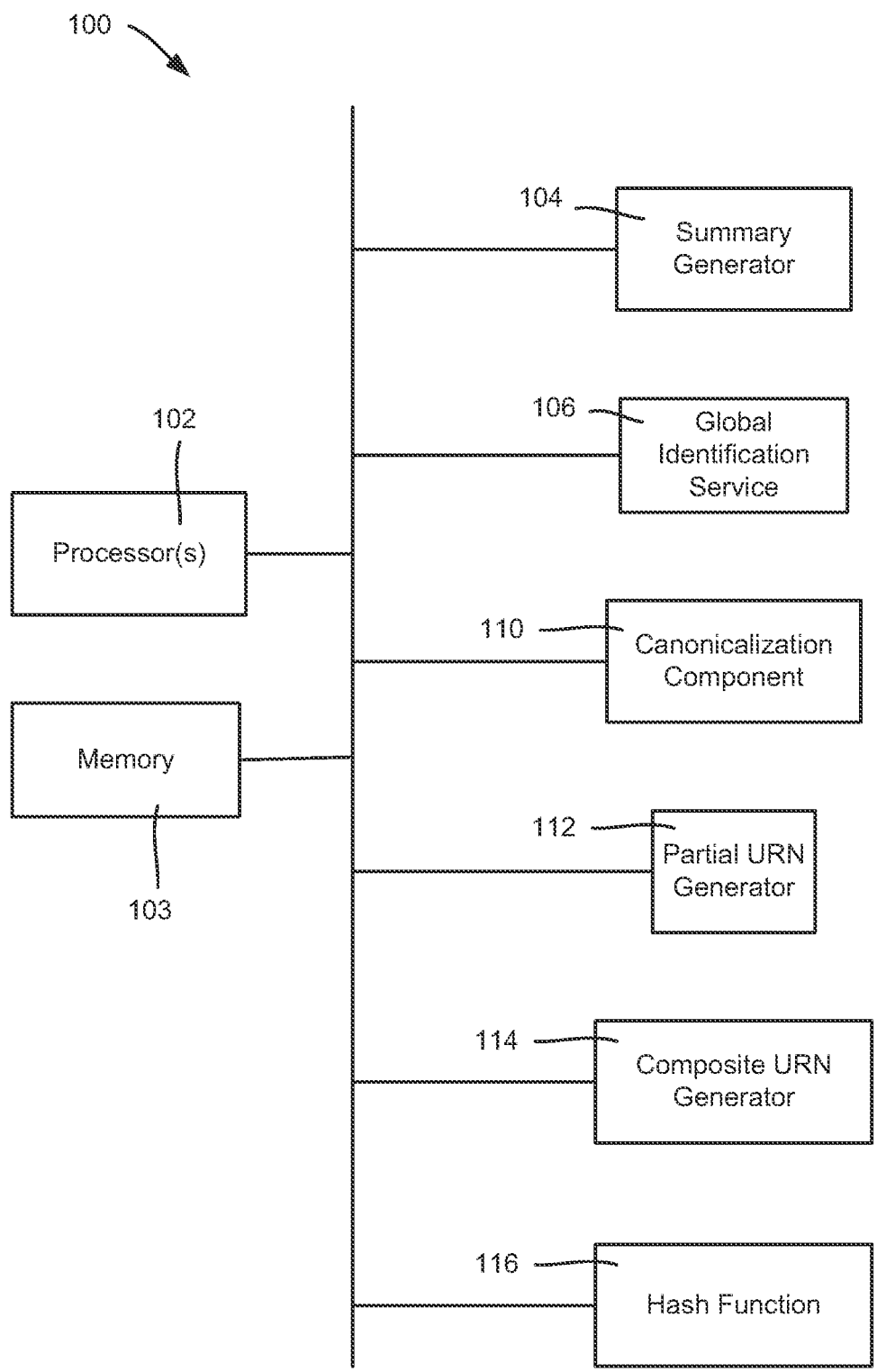
FIG. 1 is an example block diagram representation of components that provide for consistent identification and locating of entertainment data, according to one or more example implementations.

FIG. 1 is a block diagram representing an example system 100 of components that can be used to implement various aspects of the technology described herein. Aspects of the example system 100 comprise translating one of the many possible names of an entity to another name and/or using a name/identifier to return a response, canonicalizing the name of an entity, and/or generating a URN that is both consistent yet flexible.

Figure 2:
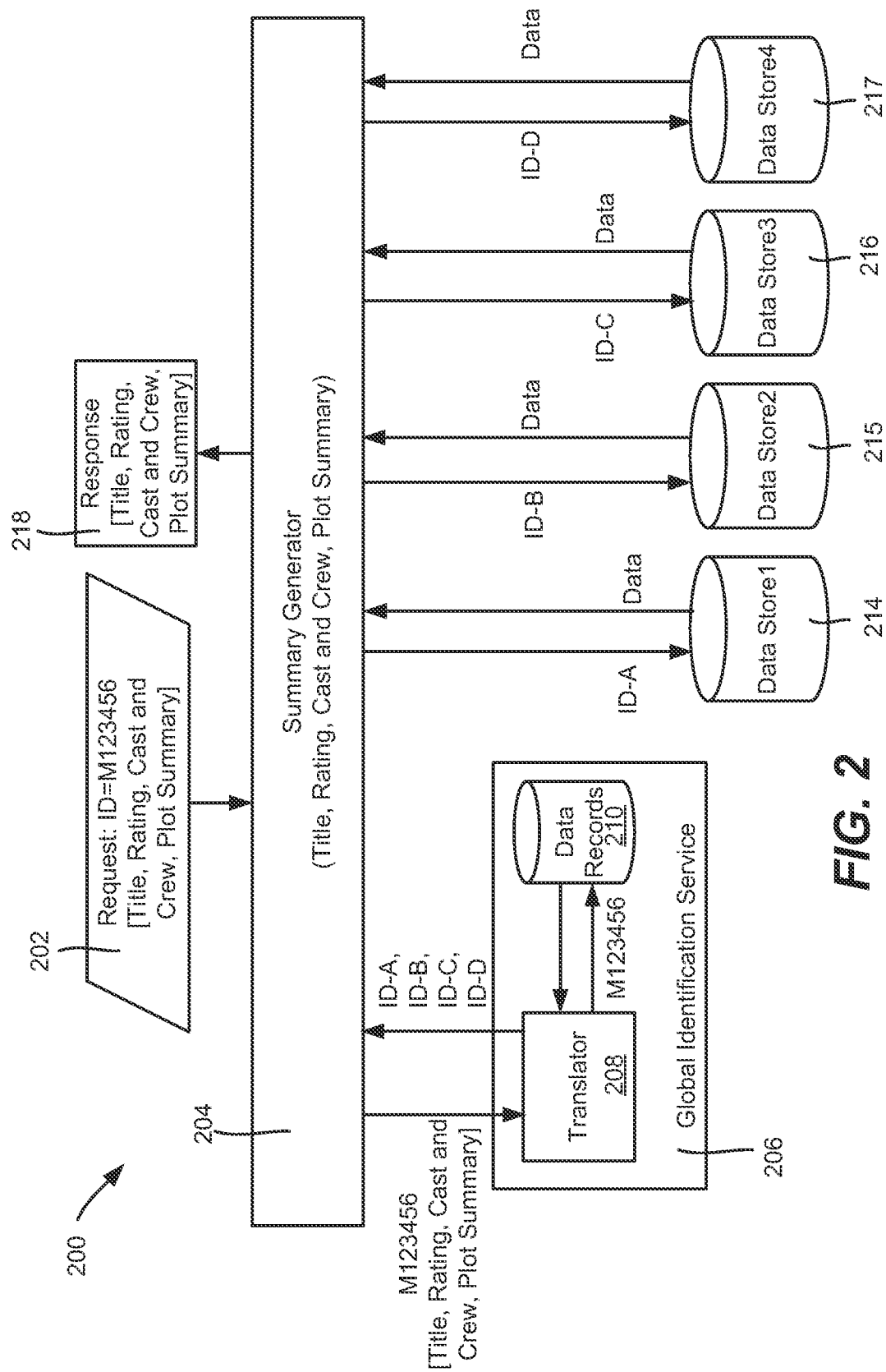
FIG. 2 is an example block diagram representation of components that provide for location of entertainment data when inconsistent identifiers may be present, according to one or more example implementations.

As shown in FIG. 1, processor(s) 102 (any suitable processor or processors) and memory 103 (comprising any suitable storage device or devices) can be coupled to a summary generator component 104 and a global identification service 106 (corresponding to blocks 204 and 206 respectively, in FIG. 2). Note that "coupled" refers to any remote and/or local communication; e.g., the summary generator component 106 and the global identification service 108 can be coupled to one another remotely by a network connection, and each can have its own local processor (also represented by the processor(s) 102). As described herein with reference to FIGS. 3 and 4, the processor(s) 102 and the memory 103 can be coupled to a canonicalization component (e.g., logic or process) 110. The processor(s) 102 and the memory 103 also can be coupled to a partial URN generator 112 and composite URN generator 114 (blocks 610 and 614 respectively, FIG. 6). As will be understood, a hash function 116 is available to relevant ones of the above components.

Note that in a given implementation, not all of the components represented in FIG. 1 need be present in a given implementation of the system 100, and/or need not be present at the same time. For example, data saved by one component can later be used by another component at a later time, the system 100 can be implemented as separate subsystems, and so on.

FIG. 2 is a block diagram representing an example implementation that can be used for dealing with the relating of entities such as movies and television shows that may be named using various, disparate schemes. For example, as represented in FIG. 2, consider that some organization, person or the like has a movie identifier (exemplified according to a hypothetical naming scheme as "M123456"), for which the title, rating, cast and crew and plot summary is desired. However, one or more of the data store or stores that contain desired information related to this movie identifier do not recognize the "M123456" identifier, and/or that the requestor may not know (at least some of) which data store or stores even contain the information.

As represented in FIG. 2, in one or more implementations, the "M123456" identifier is received, via a request 202, by a summary generator 204. In one or more implementations, the global identification service 206 can simply return all translated identifier names for the "M123456" identifier, with the summary generator expected to know which translated identifiers correspond to which data store and field(s) therein to query.

However, in the example of FIG. 2, the identifier 202 is also accompanied by the desired data field information being requested to be summarized by the summary generator 204, e.g., title, rating, cast and crew and plot summary. This may not be needed; however two different data stores may refer to the same data field by different names, e.g., "release year" in one data store versus "year" in another, and the global identification service 206 can return the corresponding field name(s) per data store. Also, if there are many identifiers to be translated, it may be more efficient to only return the identifiers needed for relevant data stores, instead of all translated identifiers. In alternative examples, there can be a global identification service configured to return identifiers corresponding to at least this desired information even when the information/data field is not specified directly; e.g., identifiers corresponding to the top N most likely desired movie data fields can be returned that includes the title, rating, cast and crew and plot summary; (other related information such as one or more representative images of the movie and so forth also may be automatically provided).

In FIG. 2, the summary generator 204 forwards data corresponding to the request to a global identification service 206. In the example implementation of FIG. 2, the global identification service 206 is a separate service, available to any appropriate caller, including the summary generator 204; however it is understood that the global identification service 206 can be incorporated into or otherwise invoked by the summary generator 204, e.g., as an instance thereof, and so on.

As further represented in FIG. 2, the global identification service 206 incorporates a translator 208 and data records (data record set) 210. The data record set 210 can contain information regarding (typically) numerous identifiers, including identifiers from disparate identification schemes, and data fields containing properties of each identifier. In this example, the translator 208 accesses the data records 210 to find the desired information regarding the "M123456" identifier. This may be performed via a filtered query, or by receiving the entire record set for the "M123456" identifier and post filtering. Note that post filtering also may be performed by the summary generator 204, although in general, the less information communicated across any system of components, the more efficient the system.

In the example of FIG. 2, consider that to respond to the request, the summary generator 204 thus needs to locate the movie's title corresponding to the "M123456" identifier that is maintained in a data store (DS1) 214, the movie's rating from another data store (DS2) 215, the movie's cast and crew information from yet another data store (DS3) 216, and the movie's plot summary from still another data store (DS4) 216. However, in this example, at least one of the data stores DS1, DS2, DS3 and DS4 do not recognize the movie identifier M123456, and instead use some other naming/identification system. Note that in this example the summary generator 204 knows the data stores, e.g., their URLs, needed to obtain the various pieces of information; (in alternative implementations, the summary generator 204 may not know the data stores' corresponding URLs or the like, and thus needs not only the IDs translated if appropriate for each data store, but also the URL or the like of each ID's corresponding data store).

In the example of FIG. 2, the data records 210 contain the corresponding, per data store identifier for the "M123456" identifier that is used by each data store. This is shown in FIG. 2 via ID-A, ID-B, ID-C and ID-D. The data stores data store1-data store4 are represented in FIG. 2 via the four data stores labeled 214-217, respectively. As is understood, although four data stores 214-217 are shown for purposes of this example, there may be any practical number of data stores.

Recall that in this example, the title is in the data store1 (214), the rating in data store2 (215), the cast and crew information in the data store3 (215), and the plot summary in the data store4 (216). Note that it is likely in a given implementation that at least two or more parts of the requested information are in the same data store, however FIG. 2 is intended to be only an example; (e.g., data store1 could contain both title and rating, in which event a single query to data store1, possibly identifying the desired fields that contain the data, can obtain both).

The summary generator 204 receives the ID information {ID-A, ID-B, ID-C, ID-D} from the global identification service 206, e.g., sequentially ordered to match the order requested, or associated with information indicating title, rating, cast and crew and plot summary, respectively. Using this information, the summary generator 204 queries each data store with the appropriate corresponding identifier, shown in FIG. 2 as ID-A-ID-D. If appropriate, the summary generator 204 also specifies the data type field(s) for which data is to be returned for the given ID. For each query, the summary generator 204 receives the requested data in a corresponding response.

The summary generator 204 arranges the data received from the data stores 214-217 based on the initial request 202, and returns the information to the caller (e.g., a client program) in a suitable response 218. Note that the above example does not discuss errors, such as an unrecognized identifier being input into the global identification service 206, or a failure of one of the data stores 214-217, however suitable error handling operations are understood to be present.

In this way, any identifier recognized by the global identification service 206 can be translated to a different identifier as used by a supported data store. Note that in the event more than one data store contains the relevant information, e.g., three different data stores can contain movie titles, then the global identification service 206 can be instructed by the caller (e.g., the summary generator 204) as to which one is desired, or the global identification service 206 can return more than one, along with an indication as to which translated identifier goes with which data store, or can have a default selection scheme. It is also feasible to attempt to make the process more efficient by selecting a data store based on additional information being sought; e.g., in the alternative example above in which the title and rating were in the same data store, and the request seeks both the title and rating, than it may be more efficient to select the data store that contains both pieces of information, rather than return translated identifiers for separate data stores. As can be readily appreciated, numerous alternatives are feasible.

Note that in another alternative to the above example, the global identification service 206 can return a list of [identifier, data store] pairs for a given identifier. Note that instead of a URL to a data store, a more compact identifier may be returned that the caller can map to a URL. In any event, given an identifier such as M123456, the global identification service 206 can return (any practical number of) [identifier, data store] pairs such as {[ID-1, DS1], [ID-B, DS2], [ID-C, DS-3], [ID-D, DS4] . . . [ID-XYZ, DS39]}.

In yet another alternative, any other identifier may be input to obtain a related output. For example, given the identifier ID-C, the global identification service 206 can, in a reverse lookup operation, return ID-A, ID-B, M123456 and ID-D (possibly along with others).

Figure 3:
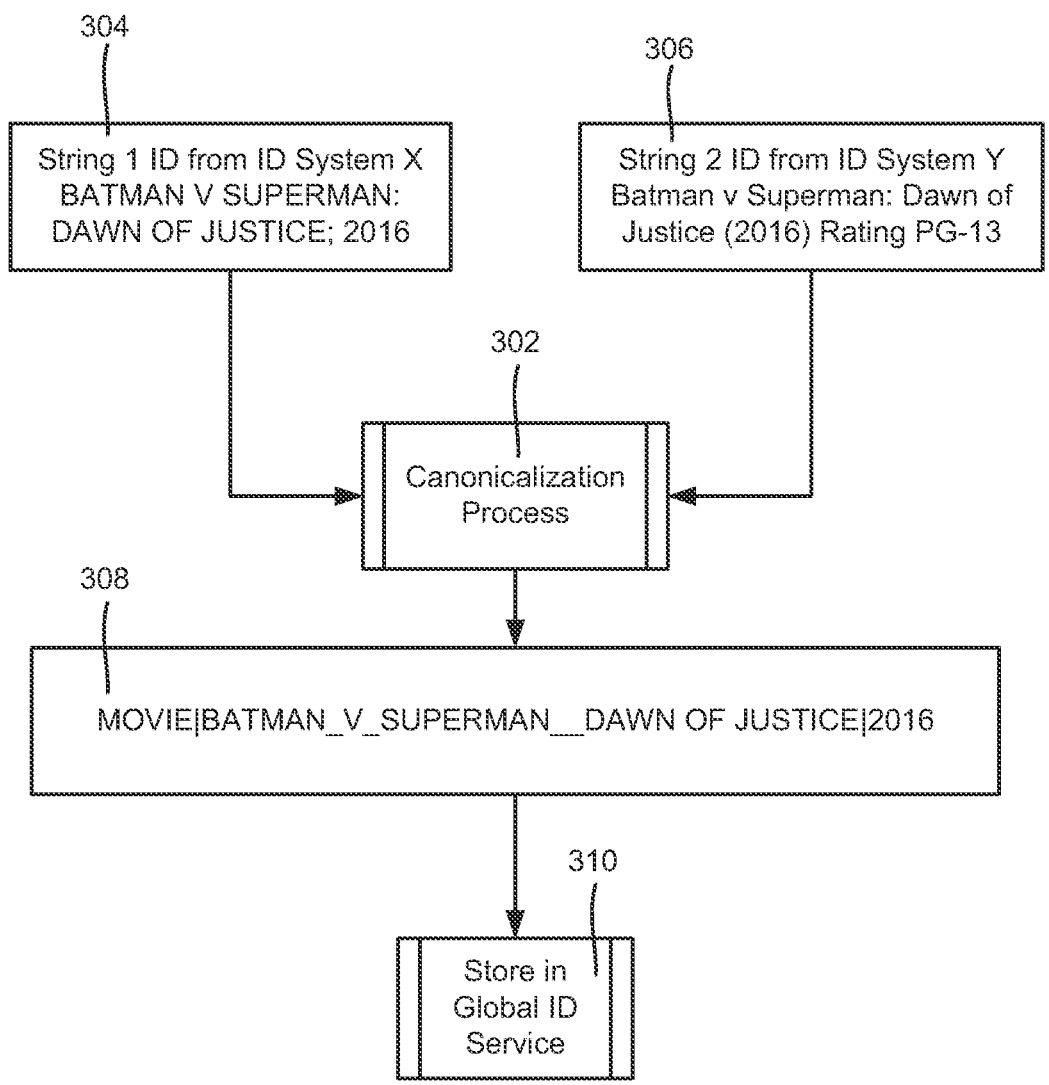
FIG. 3 is an example representation of canonicalization of different strings representing the same entity into a consistent, canonicalized identifier, such as for storage in a global identification service, according to one or more example implementations.

FIG. 3 illustrates a canonicalization component (e.g., process/logic) 302 that in general comprises rules and operations that ensure that the same two (or more) entities with different underlying formats or the like will be associated with the same identifier. In the example of FIG. 3, the same movie arranged in one format (a string 1) by one system X (block 304) is arranged in another format (a string 2) by another system Y (block 306). In this example, the string 1 is "BATMAN V SUPERMAN: DAWN OF JUSTICE; 2016" while the string 2 is "Batman v Superman: Dawn of Justice (2016) Rating PG-13." As can be seen, the same movie is being referenced in block 304 and block 306, but the strings are different.

In general, following rules and operations as described herein (e.g., with reference to FIG. 7), the canonicalization component 302 canonicalizes both of these strings in the same way, e.g., "MOVIE|BATMAN_V_SUPERMAN_DAWN OF JUSTICE|2016." In general and as will be understood, in one implementation lowercase characters become uppercase characters, whitespace (one or more contiguous space characters) become a single underscore character and (most) punctuation becomes single underscore character. A first pipe "|" character separates the entity type "MOVIE" from the canonicalized title, and a second pipe "|" character separates the title from the release year. Note that the release year is a property of any movie, and is used in part of the canonicalized string to disambiguate movies with the same title having different release years (e.g., remakes). However a property such as rating is not part of the canonicalized string, because rating is redundant or if different lead to different hashes (the same entity can have different ratings in different systems, or even in the same system, such as original rating versus edited for television rating).

Once the canonicalized string is built, the canonicalized string can be stored, e.g., in the global ID service 206 of FIG. 2. Note that the two input strings (e.g., in blocks 304 and 306) need not be input at the same time to obtain the same resultant canonicalized string. Indeed, a third string format, possibly one developed in the future, will receive the same canonicalized string as long as the title and year are correct.

Figure 4:
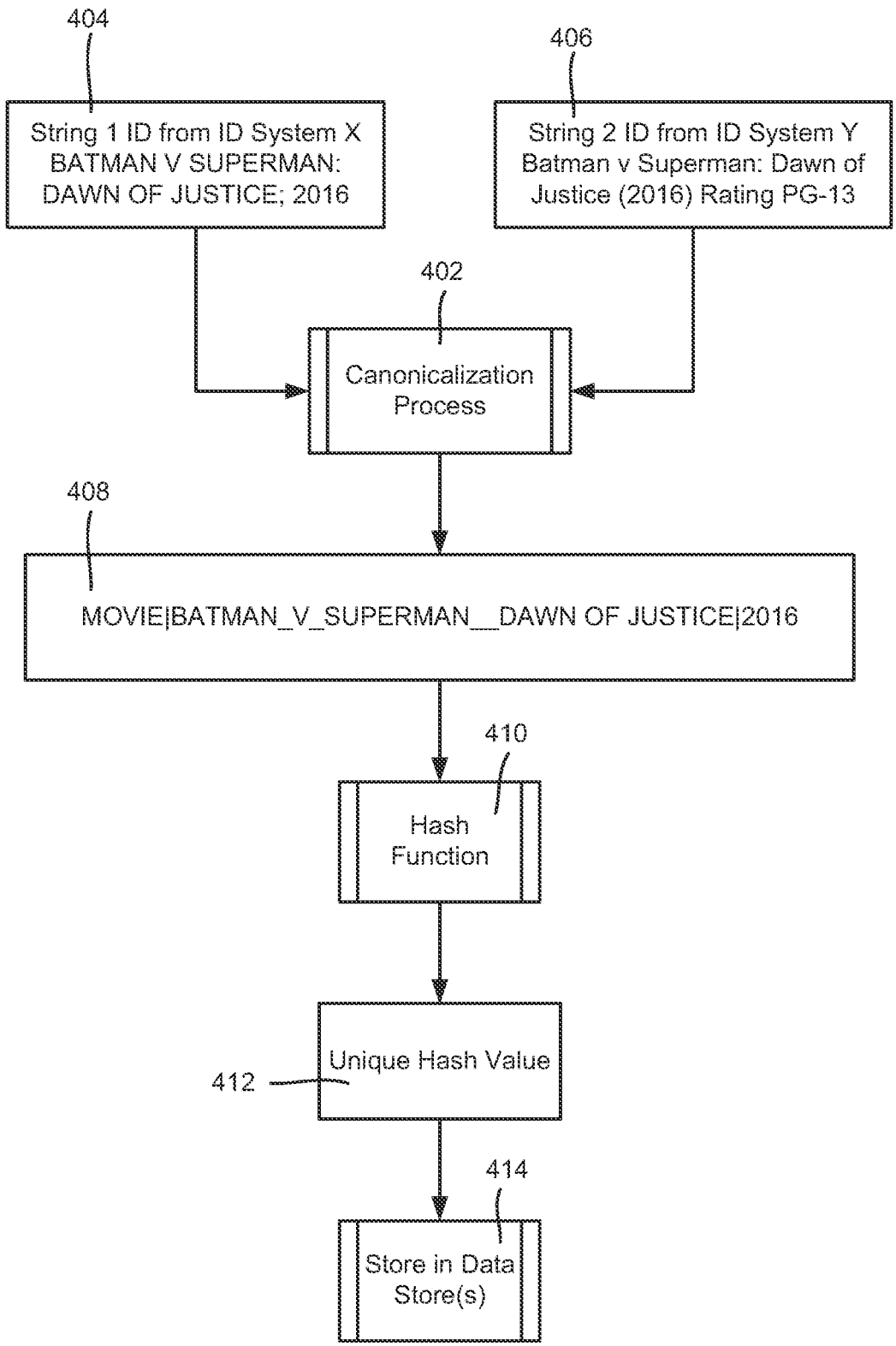
FIG. 4 is an example representation of canonicalization of different strings representing the same entity into a consistent, canonicalized identifier, and generating a hash value for representing that canonicalized identifier, according to one or more example implementations.

FIG. 4 illustrates a similar canonicalization component (e.g., process/logic) 402 that in general operates the same way as the example of FIG. 3. However, in addition to (or instead of) storing the canonicalized string in the global ID service 206, a hash function/hashing process 412 hashes the canonicalized string into a unique hash value 412, for storing (block 414) in any suitable data store(s) as desired. In this way, two different string formats referencing the same entity receive the same unique hash value. Note that the two input strings (e.g., in blocks 404 and 406) need not be input at the same time to obtain the same resultant hash value. Indeed, a third string format, possibly one developed in the future, will receive the same hash value as long as the title and year are correct.

Additional non-limiting example types include television series. e.g., SERIES|GAME_OF_THRONES, a television series with an episode as a property, e.g., SERIES|GAME_OF_THRONES|EPISODE54, and a television series with season and season number, episode as properties, e.g., SEASON|1|GAME_OF_THRONES|EPISODE1. In general, the type is first, followed by concatenated relevant properties (those that disambiguate different entities from one another).

Still other non-limiting example properties can include extra content such as trailers or previews, e.g., SERIES|GAME_OF_THRONES|EPISODE1|EXTRA| PREVIEW|WINTER_IS_COMING, franchise, party (person or character, not necessarily a human).

Figure 5:
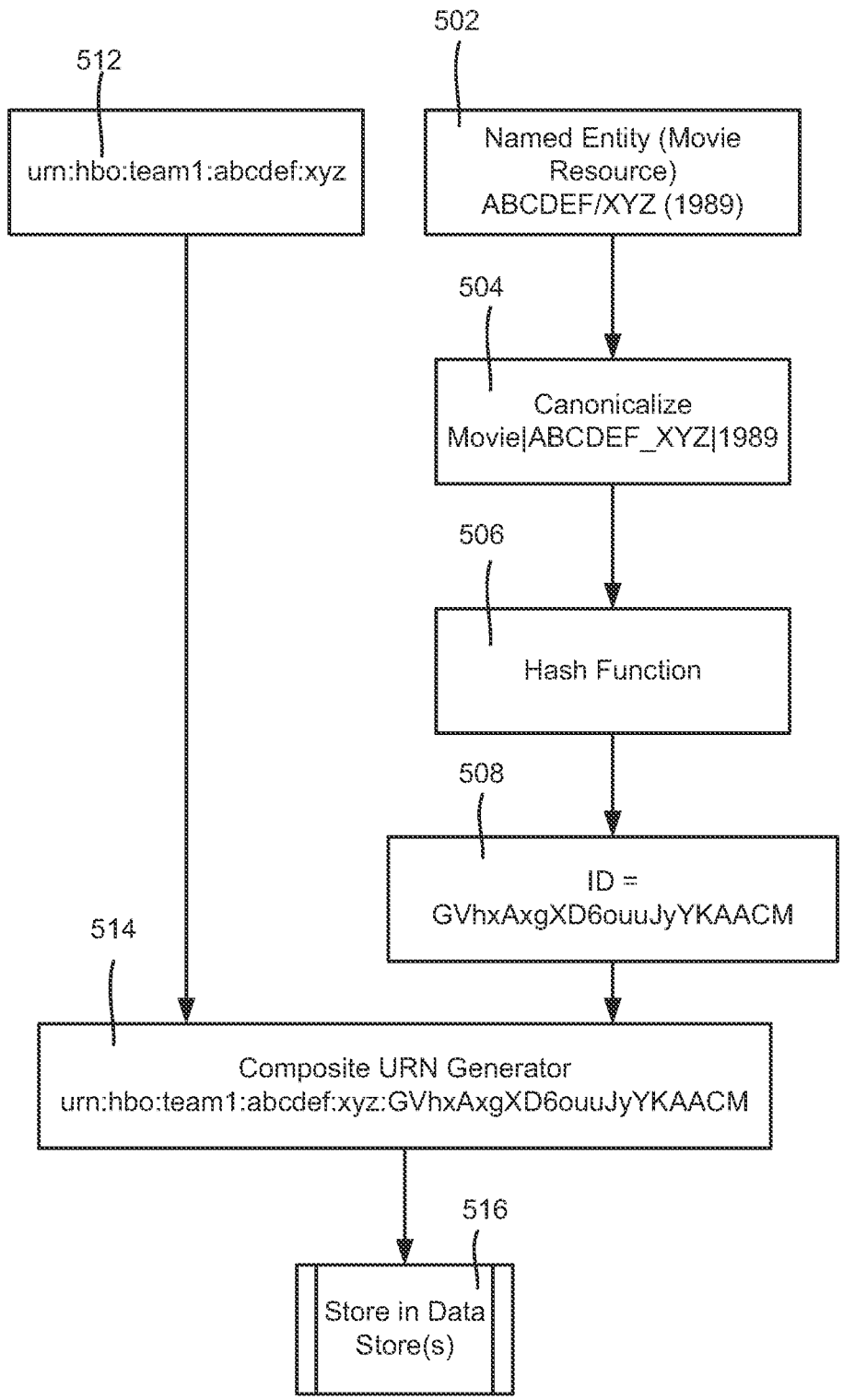
FIG. 5 is an example representation of converting a string to a URN (uniform resource name) based on a consistent naming convention that allows some customization, along with according to one or more example implementations.

FIG. 5 shows another aspect of the technology described herein that leverages a canonicalization component (e.g., process/logic), such as the canonicalization component (e.g., process/logic) of FIG. 3, to produce URNs that are consistent with respect to identifying an entity, yet flexible to allow some customization. Further, as will be understood, an organization can specify certain naming convention rules that need to be followed internally.

As shown in FIG. 5, block 502, a named entity is 502 is selected for naming according to a standard convention for naming such entities, based upon the Uniform Resource Names (URN) standard. Note that when digitally identifying resources, a URN may be used to name each resource; however, while the URN standard permits maximum extensibility for names, it does not provide conventions covering the origin or type of a given resource. Without a specific standard for naming entities, this information is accounted for inconsistently or left out entirely. By following a convention, the originator and type of a resource are known, and there is no possible confusion with respect to other named entities. Data services and corporate groups can thus exchange information in a consistent, structured way.

FIG. 5 shows a convention system for naming entities using URNs, in which in this example, the entity is identified by a string "ABCDEF/XYZ (1989)." The string is canonicalized at block 504, such as described above with reference to FIG. 3, into "Movie|ABCDEF_XYZ|1989" in this example. Block 506 hashes the canonicalized string "Movie|ABCDEF_XYZ|1989" into a hash value 508 as its identifier (ID) which equals GVhxAxgXD6ouuJyYKAACM in this example.

In parallel, at generally the same time, or at any time before or after the canonicalized ID is obtained, an upstream team provides the following which can be considered (partial) URN 512, "urn:hbo:team1:abcdef:xyz" in this example. For example, the team can use its own internal naming system for the entity, along with rules that identify the team. In this example, the Organization (with "hbo" for Home Box Office, Inc. in lowercase for URN purposes) and an Authority within that organization (that is responsible for the entity) are the first two substantive segments of any URN, e.g., "urn:hbo:team1:_____" (where "hbo" identifies the Organization, "team1" is the Authority (a group or team within HBO) and the underscores represent any internal naming system/taxonomy (e.g., program/version) desired by the "team1" Authority ("abcdef/xyz" in this example). Note that no internal segments are needed in one or more implementations.

When the URN is used as a type specifier, the underscored section may simply be a type namespace. When the URN is used as a resource identifier, the final segment of the URN can contain a valid, durable identifier of one item in that namespace. For example, if the canonicalized identifier described above is used as the identifier at the end of the URN, a composite URN is generated by block 514, such that the composite URN contains the hashed ID "GVhxAxgXD6ouuJyYKAACM" in FIG. 5. Note that the identifier cannot contain a colon character (":") as this would be interpreted as separating two URN segments. The composite URN can be stored in one or more data stores (block 516).

Consider another example URN for the same ID, in which there are seven segments:
urn:hbo:teamX:hbogo:1.0:catalog:feature:
    GVhxAxgVh5ZRpwnAKAABm Segment 1 ("hbo") is the Organization to which descendant Authorities, types and resources belong. Segment 2 ("teamX") is the name of the Authority, which is responsible for originating the resource and keeping it as a source of truth. Beyond the second segment, naming is at the discretion of the Authority (except for the final identifier segment). Segment 3 ("hbogo") is the name selected by the Authority for the source of truth. Segment 4 ("1.0") is the semantic version number of Segment 3. Segments 5 and 6 ("catalog: feature") are the Authority's type namespace for the identifier. Segment 7 ("GVhxAxgVh5ZRpwnAKAABm") is the Authority's native identifier for the resource.

Thus, at least the Organization and Authority, and in this example also the version and type, are known from this URN. Note that the hashed, canonicalized entity ID (for example, as described herein with reference to FIGS. 3 and 9) can be present in the final segment if the party using the URN is intending to refer to a specific entity.

As part of the flexibility, the Authority in control of its namespace beyond segment 2 may opt to leave out segments. In such cases, removing the source of truth, the version, the type or the identifier will result in less fidelity and (likely) multiple matching entities. Note that based on the URN standard, the colon (":") character, which separates the segments, cannot be part of a segment name (including part of the hashed entity ID), as such a colon would be interpreted as separating two segments.

Figure 6:
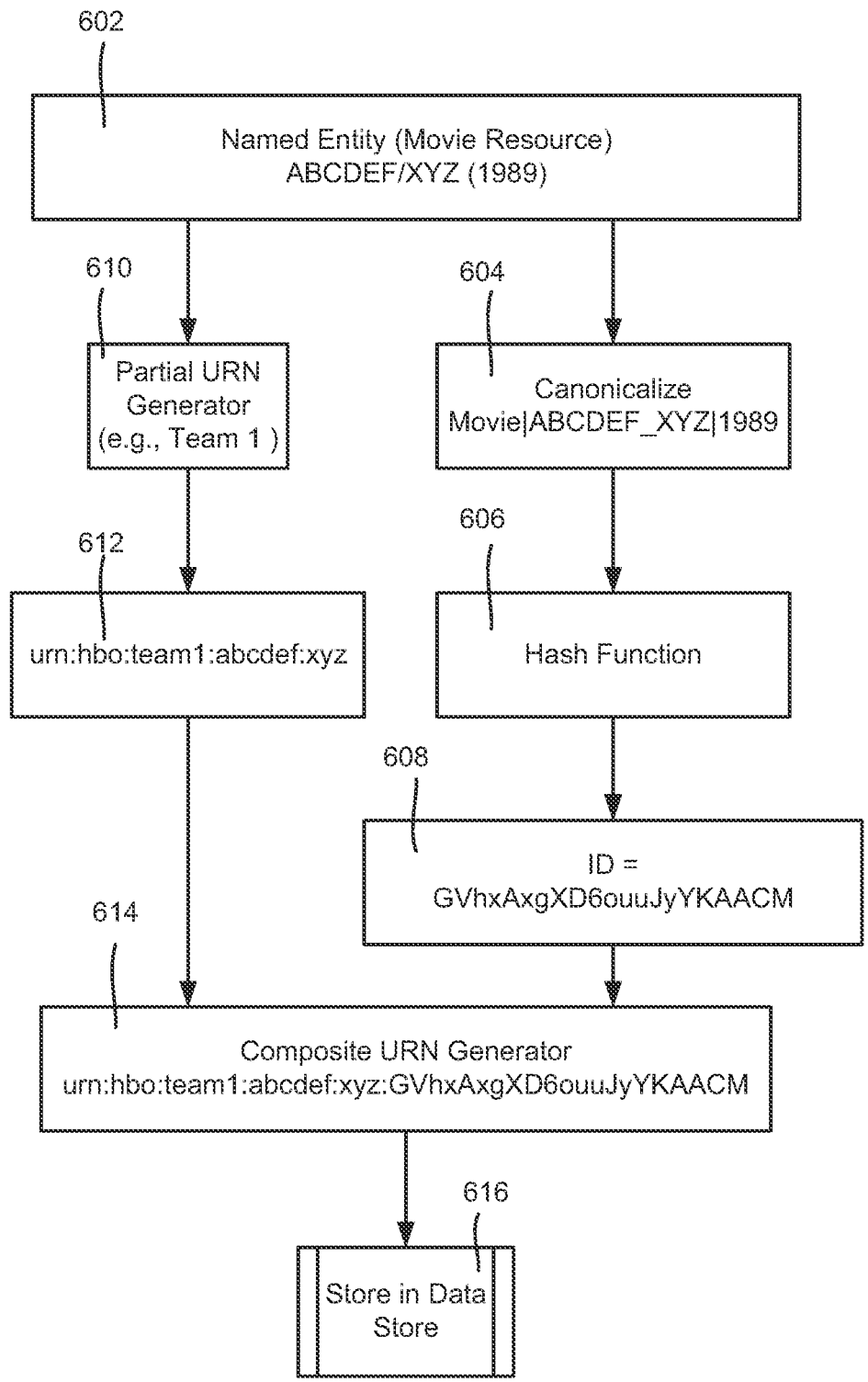
FIG. 6 is an example representation of converting a string into a partially generated URN and consistent, canonicalized identifier into a composited URN using a consistent naming convention that allows some customization, along with according to one or more example implementations.

FIG. 6 is similar to FIG. 5, but provides a partial URN generator 610 that assists in generating the partial URN 612 corresponding to some internal organization group ("Team 1"). In FIG. 6, the partial URN generator 610 generates the following partial URN, "urn:hbo:team1:abcdef:xyz" in this example. The internal organization group can provide the partial URN 612, or the partial URN generator 610 can be implemented throughout an entire organization, as long as the partial URN generator 610 has access to the internal naming systems/taxonomies/naming rules of its various internal teams.

Turning to one example implementation of a summary generator and global identification service such as in FIG. 2, two or more organizations and/or groups within organizations often have different names for the same entity. Described herein is a centralized (or decentralized) service to translate and convert such names to one another, such as to compare names, perform lookups and perform reverse lookups. For example, given one group's identifier for a movie (e.g., M233298), there needs to be a way to reference the movie as identified in another group, (e.g., hbo:teamX: movie: GVhxAxgZLMMITwy0KAAB).

In general, the global identification service is responsible for providing appropriate callers with a way to recognize and access entity data, despite data services and corporate groups using different identifiers and naming systems for the same entity. To this end, the global identification service translates one of the many possible names of an entity to another name.

Figure 7:
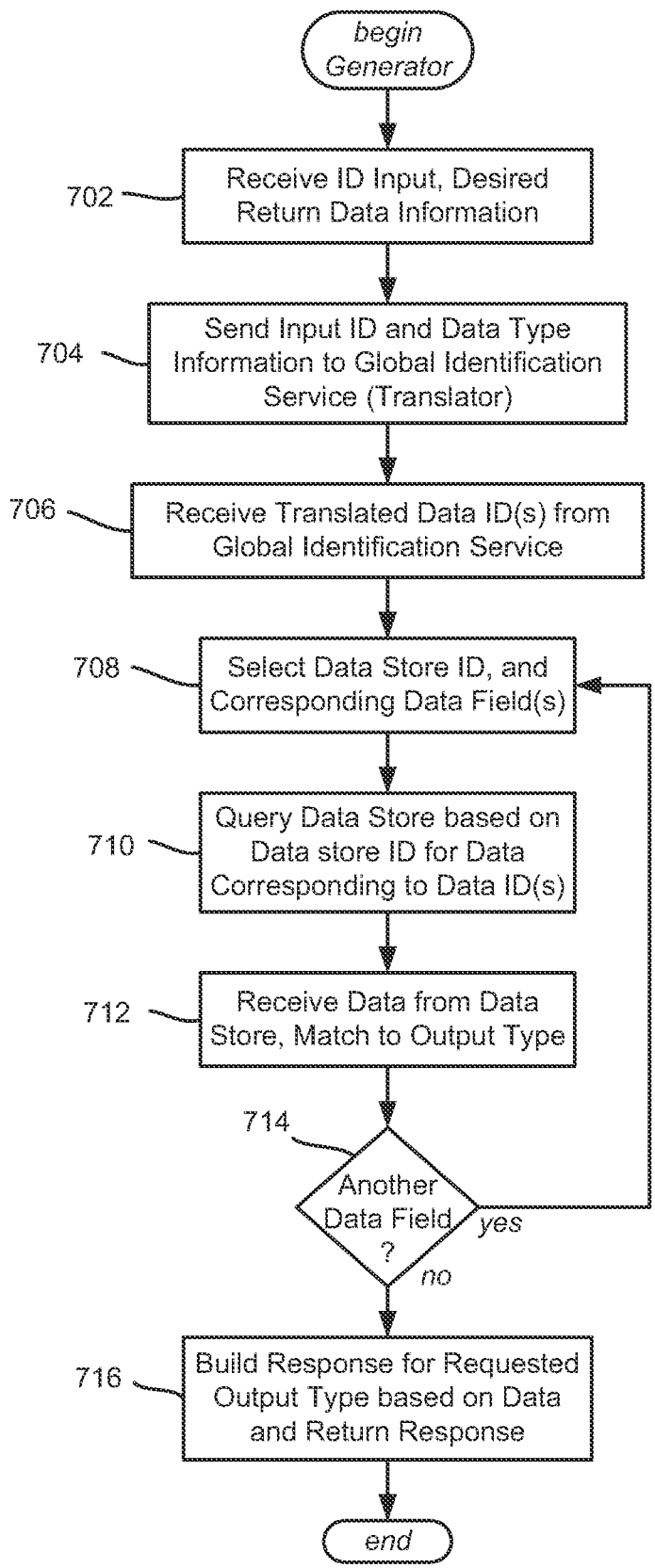
FIG. 7 is a flow diagram showing example logic/operations of a generator component corresponding to locating entertainment-related data when inconsistent identifiers may be present, according to one or more example implementations.
Figure 8:
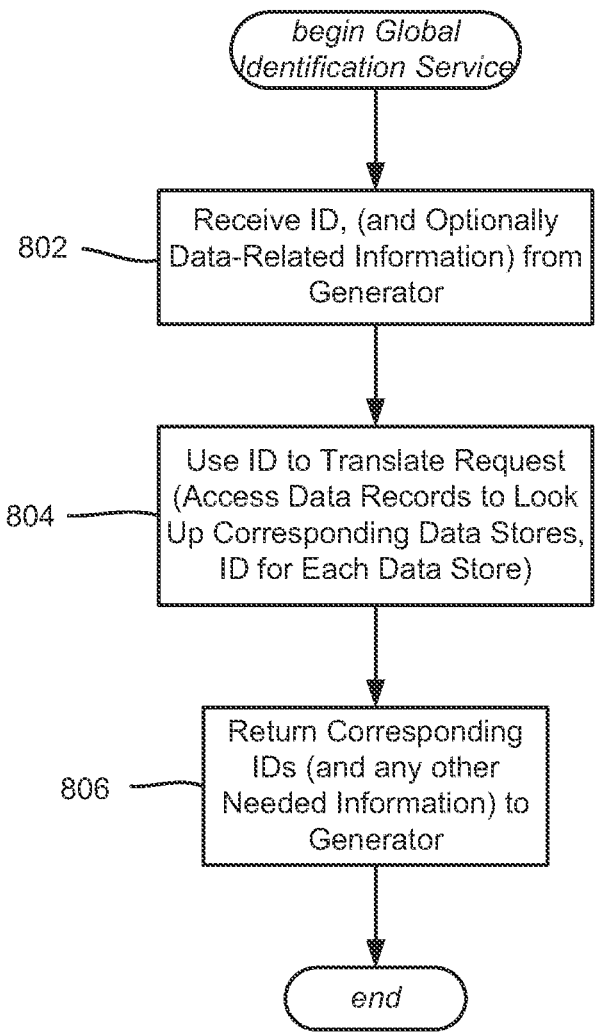
FIG. 8 is a flow diagram showing example logic/operations of a global identification service corresponding to locating entertainment-related data when inconsistent identifiers may be present, according to one or more example implementations.

FIG. 7 shows example operations of one such summary generator, coupled to a global identification service (with example operations summarized with reference to FIG. 8). Operation 702 represents receiving as input the identifier (ID), and, if appropriate, the desired returned data fields' data or the like for which information is to be returned, e.g., the title, rating and so on.

Operation 704 represents sending the input ID and the desired data field information to the global identification service for translation. Example operations of one such global identification service are described with reference to FIG. 8.

Operation 706 represents receiving the translated IDs corresponding to the requested data from the global identification service. Any other information may be returned, e.g., identifiers of the fields for which the data is desired for the entity ID; for example, for a movie, one data store may refer to the release year data field as "release year" while another data store simply uses "year" as the field name.

Operation 708 represents selecting the data store ID (e.g., URL) corresponding to a translated identifier, and the corresponding data field name ID(s). Operation 710 queries data store based on data store ID for data corresponding to the data field(s) for which data is desired.

Operation 712 represents receiving the relevant data as requested from the data store, which is matched to the desired information to return to the originator of the request. Operation 714 represents repeating the process for any other data field(s) for which data is needed. As can be readily appreciated, operations 708, 710 and 712 can be performed in parallel or substantially in parallel, e.g., there is generally no reason to wait for one piece of data to be received before querying for another piece of data, unless the other query depends on data received from a previous query.

Operation 716 represents building the response based on the received pieces of data, and returning the response to the originating caller. In the example of FIG. 2, this comprises the title, rating, cast and crew and plot summary placed into a suitably formatted return response.

FIG. 8 shows example operations of one global identification service that works with a caller (e.g., with the summary generator's example operations of FIG. 7). Operation 802 represents receiving an ID, (and optionally data-related information such as data field information and/or request(s) for a data store URL or data stores URL) from the generator; (e.g., sent by the generator at operation 704 of FIG. 7).

Operation 804 represents using the ID to translate the request (that is, access the data records of the global identification service) to look up the corresponding translated identifiers, and any other needed information, e.g., field name(s), data store URL(s) and so on), which is returned to the requesting caller (the summary generator) at operation 806; (e.g., received by the generator at operation 706 of FIG. 7).

As can be seen, an originating caller with only one identifier (e.g., "M123456") can get back a set of desired information for that identifier, even though (at least one of) the data stores do not use that particular identifier. This is highly advantageous, as existing systems can leverage information from one another without needing knowledge of the possibly many others' identification schemes and the like, based on the global identification service.

Figure 9:
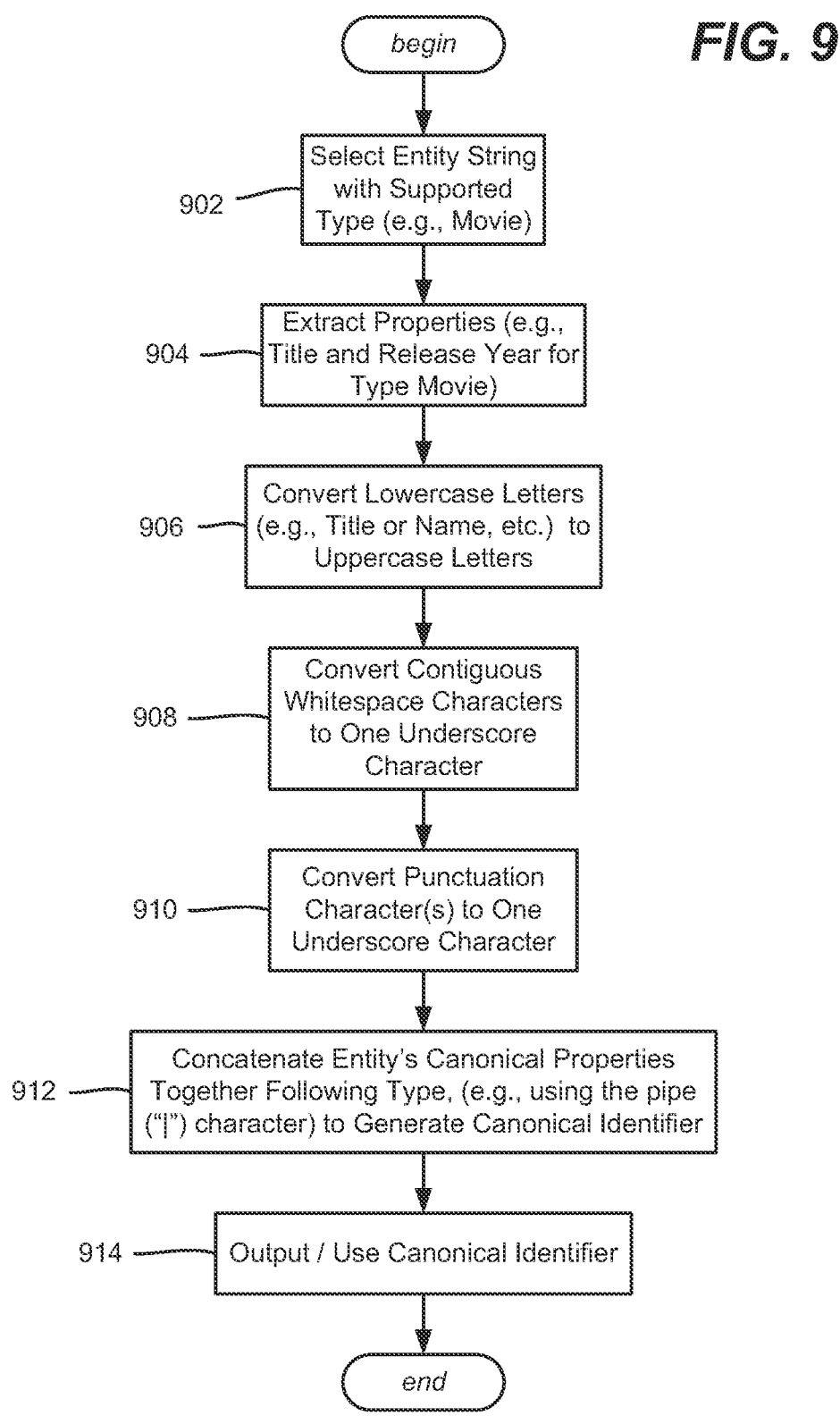
FIG. 9 is a flow diagram showing example logic/operations for canonicalization of a string into a consistent, canonicalized identifier, according to one or more example implementations.

Turning to example operations of a canonicalization component (e.g., process/logic) process, FIG. 9 shows how an entity string can be canonicalized, beginning at operation 902, which represents selecting an entity string with a supported type (e.g., a movie). Operation 904 extracts the properties (e.g., title and release year for a type "MOVIE"). In part of the example of FIG. 3, the string "Batman v Superman: Dawn of Justice (2016) Rating PG-13" becomes a title property "Batman v Superman: Dawn of Justice" and a release year property, "2016" (the properties are without quotes in one or more implementations).

Operation 906 represents converting the title (letters) to uppercase only letters, if not already uppercase only. Note that in this example, any numbers are left as is. For a type such as "PARTY" that represents a person or character, the name of the party is similarly converted to uppercase. Thus, the title "Batman v Superman: Dawn of Justice", becomes "BATMAN V SUPERMAN: DAWN OF JUSTICE" (again, without quotes).

In this example, operation 908 converts one or more (contiguous) whitespace characters to one underscore character. As can be readily appreciated, a different character or pattern of more than one character can be used, as long as consistent and distinguishable from characters that normally appear in titles, names and so on. However the underscore character is suitable as it does not tend to otherwise appear in titles, names or the like. In the example, the title part of the string is, at this time, "BATMAN_V_SUPERMAN:_ DAWN OF JUSTICE".

Operation 910 represents converting punctuation character(s) to one underscore character; again, instead of an underscore character a different character or pattern of more than one character can be used, as long as consistent and distinguishable. Not all punctuation need be converted to an underscore character, e.g., "Mark&Jones" (MARK&JONES) thus can be different from "Mark Jones" (MARK_JONES). In the above example, the colon character ":" becomes an underscore character, resulting in "BATMAN_V_SUPERMAN__DAWN OF JUSTICE" in one or more implementations.

Note that any punctuation character (or consecutive punctuation characters) converted to an underscore character, before and/or after a whitespace previously converted to an underscore, is thus represented by a double-underscore character or a triple-underscore character (if before and after a whitespace-produced underscore (e.g., "X:Y" becomes "X___Y" (three underscore characters); it is feasible to merge such double or triple underscores into as little as one single underscore character; (note that this could be done in a single "convert all consecutive whitespace and/or punctuation to an underscore character). However for purposes of this example, the double underscore remains in the title string.

Continuing with this example, operation 912 concatenates the entity's canonical properties together, following the type identifier, (e.g., using the pipe ("|") character) to generate the canonical identifier. Thus, with type "MOVIE" and release year "2016" the canonicalized string becomes "MOVIE|BATMAN_V_SUPERMAN_DAWN OF JUSTICE|2016" as in FIGS. 3 and 4.

Operation 914 represents outputting/using the (human-readable) canonical identifier in some way. A typical way to use the canonical identifier is to hash the canonical identifier into an entity-unique hash value as in FIGS. 3 and 4, whereby two or more hashed identifiers can be quickly compared to determine whether they represent the same entity, a hash value can serve as a key/index of a data store, and so on.

Figure 10:
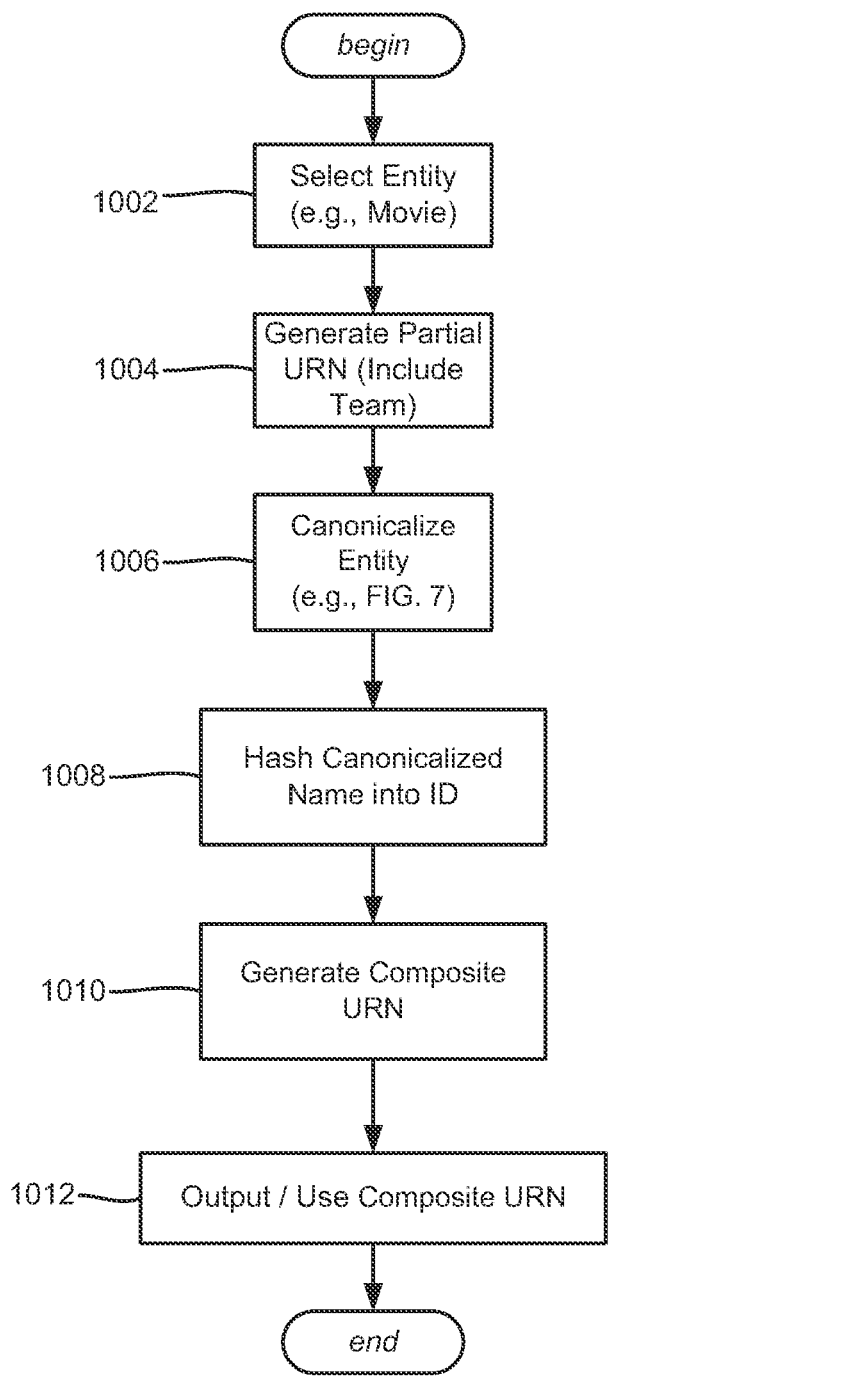
FIG. 10 is a flow diagram showing example logic/operations for converting a string, such as a string representing an entertainment entity, to a URN, according to one or more example implementations.

FIG. 10 shows example operations of generating a URN for an entity, including by using the above-described (or a similar) canonicalization component (e.g., process/logic) if appropriate. Operation 1002 represents selecting an entity (e.g., a movie string). In this example, the movie string "ABCDEF/XYZ (1989)" as in FIGS. 5 and 6 will be used.

Operation 1004 represents generating a partial URN (e.g., including the enterprise/organization name "HBO" and an internal group, or team name, "Team1"). In this example, the partial URN also includes the internal names that the team uses for the entity, e.g., abcdef and xyz, resulting in the partial URN "urn:hbo:team1:abcdef:xyz" following operation 1004.

Operation 1006, (which as can be appreciated can be performed before operation 1004, after operation 1004 or parallel with or substantially in parallel with operation 1004) represents canonicalizing the entity string, such as described above with reference to FIG. 9. Operation 1008 hashes the canonicalized name into an ID, e.g., "GVhxAxgXD6ouuJyYKAACM" as in FIGS. 5 and 6.

Operation 1010 represents generating a composite URN, e.g., by appending the hashed ID to the partial URN; urn:hbo:team1:abcdef:xyz:GVhxAxgXD6ouuJyYKAACM thus results. Operation 1012 represents outputting/using the composite URN as desired, e.g., as a reference to the entity.

As can be seen, the URN is consistent with respect to uniquely identifying the entity, yet allows an organization to insert its own name and specify rules for internal segments of the URN. Indeed, in the above example, the group "Team1" is identified, and can read Team 1's own internal name for the entity from the URN, without having to look up the entity name via the hashed identifier. At the same time, the hashed identifier uniquely and consistently identifies the entity providing the benefits and advantages of consistent identification as described herein.

Figure 11:
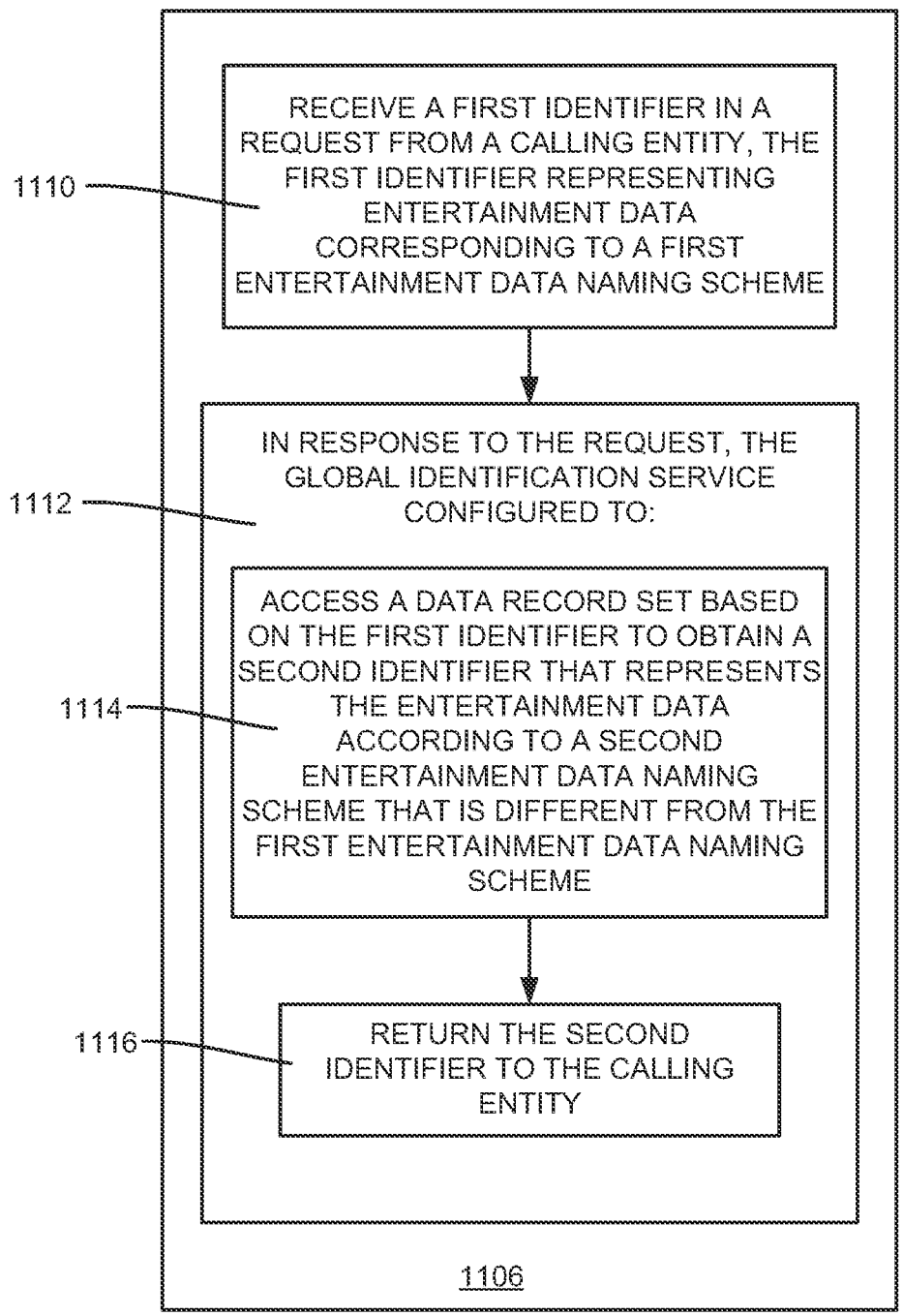
FIG. 11 is an example block diagram representation of a global identification service that can help deal with inconsistency between different identifiers of the same entertainment entity, according to one or more example implementations.

One or more aspects can be embodied in a system, comprising a memory that stores computer executable components, and a processor that executes computer executable components stored in the memory. Example computer executable components, such as represented in FIG. 11, can comprise a global identification service 1106 that receives (block 1110) a first identifier in a request from a calling entity, the first identifier representing entertainment data corresponding to a first entertainment data naming scheme.

In response to the request, the global identification service is configured to (block 1112) access a data record set based on the first identifier to obtain a second identifier that represents the entertainment data according to a second entertainment data naming scheme that is different from the first entertainment data naming scheme (block 1114), and return the second identifier to the calling entity (block 1116).

The calling entity can comprise a generator component that receives the second identifier, and uses the second identifier to access information in at least one data store.

The global identification service can be further configured to, in response to the request, access the data record set based on the first identifier to obtain a third identifier that represents the entertainment data according to a third entertainment data naming scheme that is different from the first entertainment data naming scheme, and return the third identifier to the calling entity. The request from the calling entity can comprise property information associated with the first identifier, and the global identification service can be further configured to, in response to the request, access the data record set based on the first identifier to obtain a third identifier that corresponds to the property information, and return the third identifier to the calling entity.

The global identification service can be further configured to, in response to the request, access the data record set based on the first identifier to obtain other identifiers within data fields associated with the first identifier, and return the other identifiers to the calling entity.

The global identification service can be further configured to, in response to the request, access the data record set based on the first identifier to obtain reference information corresponding to a data store that uses the second identifier, and return the reference information to the calling entity.

Aspects can comprise a canonicalization component that processes a string representing an entertainment data entity to generate a canonicalized string representing that entity for storage in the data record set. Aspects can comprise a uniform resource name generator component that generates a uniform resource name that includes the canonicalized string and/or a value representing the canonicalized string for storage in the data record set.

Figure 12:
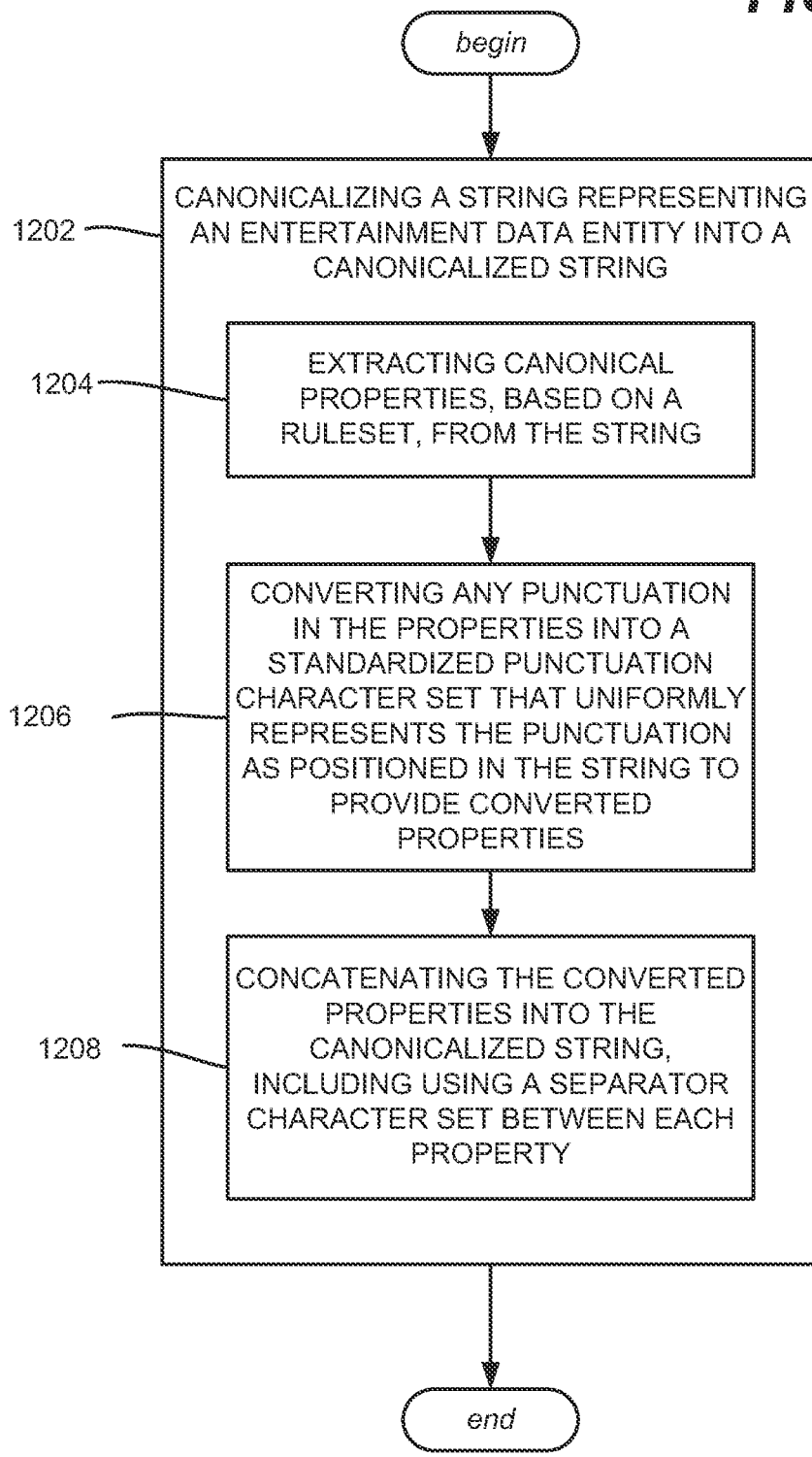
FIG. 12 is a flow diagram showing example logic/operations for processing a string representing an entertainment data entity into a canonicalized string, according to one or more example implementations.

One or more example aspects, such as corresponding to operations of a method, are represented in FIG. 12. Operation 1202 represents canonicalizing a string representing an entertainment data entity into a canonicalized string, comprising operation 1204, which represents extracting canonical properties, based on a ruleset, from the string. Operation 1206 represents converting any punctuation in the properties into a standardized punctuation character set that uniformly represents the punctuation as positioned in the string to provide converted properties. Operation 1208 represents concatenating the converted properties into the canonicalized string, including using a separator character set between each property.

Aspects can comprise including type information in the canonicalized string that corresponds to a type of the entertainment data entity.

Converting the any punctuation in the properties into the standardized punctuation character set can comprise substituting an underscore character for punctuation as positioned in the string, and using the separator character set between each property can comprise using a pipe character.

Aspects can comprise converting any whitespace in the string to a standardized whitespace character set that uniformly represents the whitespace as positioned in the string to provide the converted properties. Aspects can comprise converting any lowercase character in the string to an uppercase character to provide the converted properties.

Aspects can comprise providing a uniform resource name comprising a plurality of segments, including a segment that includes the canonicalized string. Aspects can comprise hashing the canonicalized string into a hash value that represents the canonicalized string and identifies the entertainment data entity. Aspects can comprise providing a uniform resource name comprising a plurality of segments, including a segment that includes the hash value.

Figure 13:
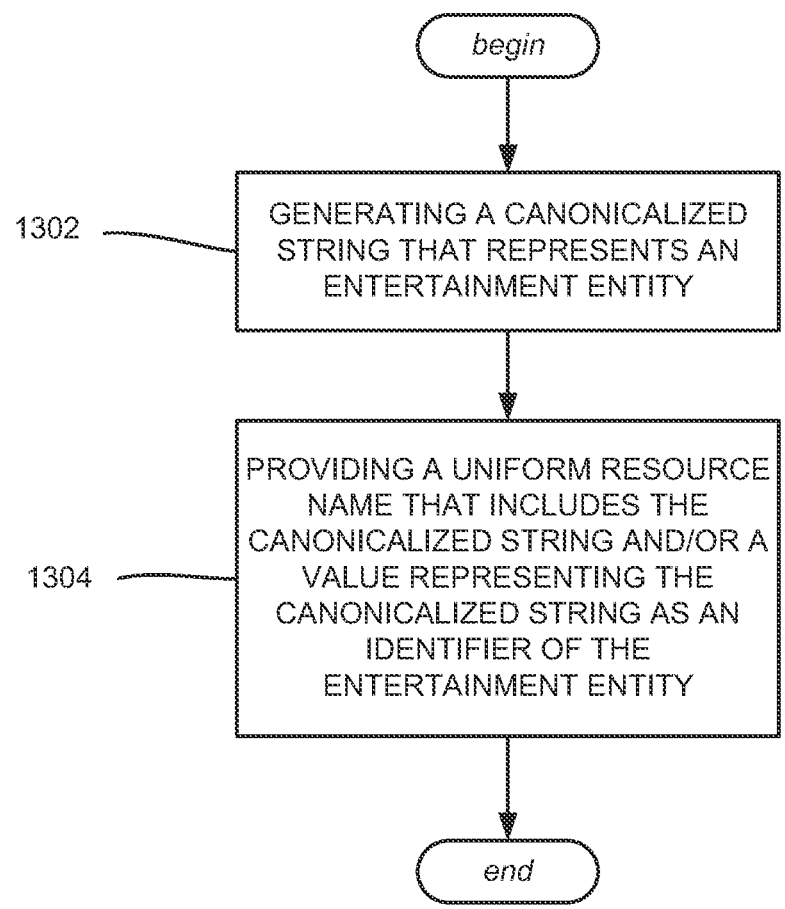
FIG. 13 is a flow diagram showing example logic/operations for providing a URN that includes a canonicalized string (or value representative thereof) for use as a consistent identifier, according to one or more example implementations.

One or more example aspects, such as corresponding to operations of a method, are represented in FIG. 13. Operation 1302 represents generating a canonicalized string that represents an entertainment entity. Operation 1304 represents providing a uniform resource name that includes the canonicalized string and/or a value representing the canonicalized string as an identifier of the entertainment entity.

Providing the uniform resource name can comprise providing a partial uniform resource name comprising a first segment representing an organization and a second segment representing an authority, and zero or more segments selected by the authority. Providing the uniform resource name can comprise generating a composite uniform resource name based on the partial uniform resource name and the canonicalized string identifier. Aspects can comprise hashing the canonicalized string identifier into a hash value; providing the uniform resource name can comprise generating a composite uniform resource name based on the partial uniform resource name and the hash value.

As can be seen, consistent identifiers as described herein can provide benefits with entertainment data that are often named with no particular regard to other groups' need for those entities. Relating the different identifiers, canonicalizing inconsistent names (strings), and using uniform resource names eliminate many of the problems that arise from inconsistent naming conventions.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 14 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 14:
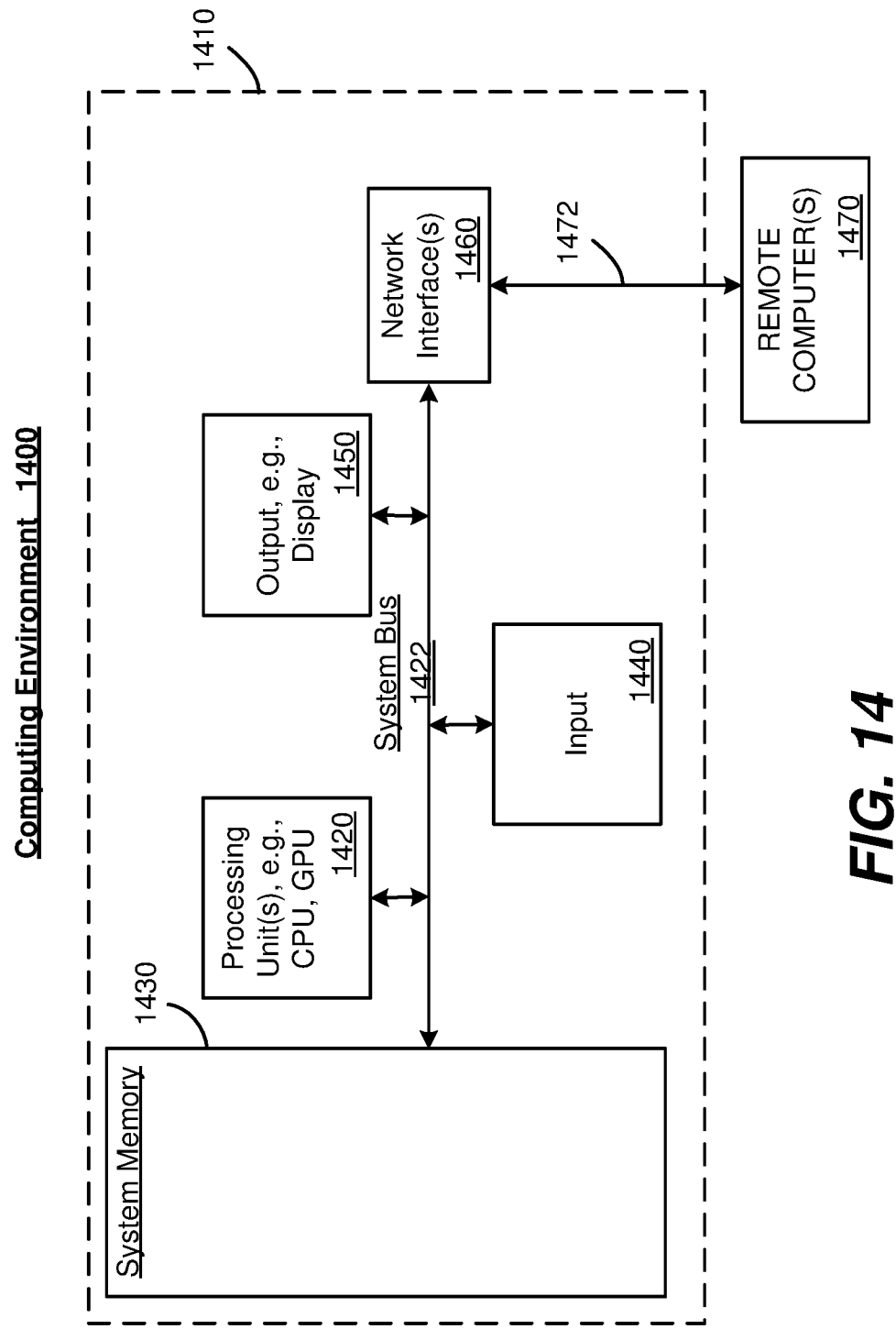
FIG. 14 is a block diagram representing an example computing environment into which aspects of the subject matter described herein may be incorporated.

FIG. 14 thus illustrates an example of a suitable computing system environment 1400 in which one or aspects of the implementations described herein can be implemented, although as made clear above, the computing system environment 1400 is only one example of a suitable computing environment and is not intended to suggest any limitation as to scope of use or functionality. In addition, the computing system environment 1400 is not intended to be interpreted as having any dependency relating to any one or combination of components illustrated in the example computing system environment 1400.

With reference to FIG. 14, an example device for implementing one or more implementations includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 typically includes a variety of machine (e.g., computer) readable media and can be any available media that can be accessed by a machine such as the computer 1410. The system memory 1430 may include computer storage media in the form of volatile and/or nonvolatile memory such as read only memory (ROM) and/or random access memory (RAM), and hard drive media, optical storage media, flash media, and so forth. By way of example, and not limitation, system memory 1430 may also include an operating system, application programs, other program modules, and program data.

A user can enter commands and information into the computer 1410 through one or more input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system comprising:
   a processor; and
   a memory that stores executable instructions that, when executed by the processor, facilitate performance of operations, comprising:
   generating a first uniform resource name from a first identifier of a group of identifiers that each represent an entertainment data item being the same entertainment data item;
   generating a second uniform resource name from a second identifier of the group of identifiers;
   wherein each identifier of the group of identifiers employs a different respective entertainment data naming scheme; and
   wherein each of the first uniform resource name and the second uniform resource name comprise:
   a canonicalized identifier representing the entertainment data item, wherein the canonicalized identifier is generated based on properties of the entertainment data item, and
   the first or second identifier of the group of identifiers from which the first or second uniform resource name was generated;
   storing the respective uniform resource names in a data structure;
   obtaining a first request for a first data stream of the entertainment data item;
   generating, based on the first request, and on the first uniform resource name or the second uniform resource name, the first data stream from a which a first video of the entertainment data item is visually generatable;
   obtaining a second request for a second data stream for the entertainment data item; and
   generating, based on the second request and on the other of the first uniform resource name or the second uniform resource name, the second data stream from which a second video of the same entertainment data item is visually generatable.

2. The system of claim 1, wherein each of the first uniform resource name and the second uniform resource name further comprises an organization identifier associated with an organization that created the respective first or second identifier of the identifiers.

3. The system of claim 1, wherein the generating the first uniform resource name and the second uniform resource name further comprises transforming, using at least one rule, the respective first or second identifier into the canonicalized identifier.

4. The system of claim 3, wherein the transforming comprises extracting properties from the respective first or second identifier.

5. The system of claim 4, wherein the transforming comprises transforming the properties into canonical properties.

6. The system of claim 1, wherein the canonicalized identifiers representing and being based on the entertainment data item includes the canonicalized identifiers comprising hashed values based on a canonicalized string representing the entertainment data item.

7. The system of claim 1, wherein the operations further comprise:
transmitting the first data stream or the second data stream as a response to an originating caller.

8. A method comprising:
creating, by a system comprising a processor, a first uniform resource name from a first identifier of a group of identifiers that each represent different versions of an entertainment data item;
creating, by the system, a second uniform resource name from a second identifier of the group of identifiers,
wherein each identifier of the identifiers, including the first identifier and the second identifier, employs a respective entertainment data naming scheme, and each of the first uniform resource name and the second uniform resource name comprise:
a canonicalized identifier representing the entertainment data item, wherein the canonicalized identifier is generated based on properties of the entertainment data item, and
the first or second identifier of the group of identifiers from which the first or second uniform resource name was generated;
storing, by the system, the respective uniform resource names in a data structure;
obtaining, by the system, a first request for a first data stream of the entertainment data item;
generating, by the system, based on the first request, and on the first uniform resource name or the second uniform resource name, the first data stream from a which a first video of the entertainment data item is visually generatable;
obtaining, by the system, a second request for a second data stream for the entertainment data item; and
generating, by the system, based on the second request and on the other of the first uniform resource name or the second uniform resource name, the second data stream from which a second video of the same entertainment data item is visually generatable.

9. The method of claim 8, wherein each of the first or second uniform resource names further comprises an organization identifier associated with an organization that created the identifier of the identifiers.

10. The method of claim 8, wherein the creating the first or second uniform resource names from the group of identifiers further comprises converting, by the system, using at least one function, the identifier into the canonicalized identifier.

11. The method of claim 10, wherein the converting comprises identifying properties of the identifier and converting the properties into canonical properties.

12. The method of claim 8, wherein the canonicalized identifier comprises a hashed value based on a canonicalized string representing the entertainment data item.

13. A non-transitory machine-readable medium comprising executable instructions that, when executed by a processor of network equipment, facilitate performance of operations, the operations comprising:
generating a first uniform resource name from a first identifier of a group of identifiers representing an entertainment data item;
generating a second uniform resource name from a second identifier of the group of identifiers,
wherein each identifier of the identifiers employs a respective entertainment data naming scheme, and each of the first and second uniform resource names comprises:
a canonicalized identifier representing the entertainment data item, wherein the corresponding canonicalized identifier of each generated first and second uniform resource name is generated based on properties of the entertainment data item, and
the first or second identifier of the group of identifiers from which the first or second uniform resource name was generated;
storing the respective uniform resource names in a data structure;
obtaining a first request for a first data stream of the entertainment data item;
generating, based on the first request, and on the first uniform resource name or the second uniform resource name, the first data stream from a which a first video of the entertainment data item is visually generatable;
obtaining a second request for a second data stream for the entertainment data item; and
generating, based on the second request and on the other of the first uniform resource name or the second uniform resource name, the second data stream from which a second video of the same entertainment data item is visually generatable.

14. The non-transitory machine-readable medium of claim 13, wherein each of the respective uniform resource names further comprises an organization identifier associated with an organization that created the identifier of the identifiers.

15. The non-transitory machine-readable medium of claim 13, wherein the operations further comprise:
transforming, using at least one rule, the identifier into the canonicalized identifier.

16. The non-transitory machine-readable medium of claim 15, wherein the transforming comprises extracting properties from the respective first or second identifier.

17. The non-transitory machine-readable medium of claim 16, wherein the transforming comprises transforming the properties into canonical properties.

* * * * *